(12) United States Patent
Won

(10) Patent No.: US 8,576,802 B2
(45) Date of Patent: Nov. 5, 2013

(54) METHOD AND APPARATUS FOR IMPROVING UNBALANCE OF SERVICE OF CELL EDGE IN WIRELESS LOCAL AREA NETWORK

(75) Inventor: Sang-Yeon Won, Seoul (KR)

(73) Assignee: Samsung Electronics Co., Ltd (KR)

( * ) Notice: Subject to any disclaimer, the term of this patent is extended or adjusted under 35 U.S.C. 154(b) by 676 days.

(21) Appl. No.: 12/622,978

(22) Filed: Nov. 20, 2009

(65) Prior Publication Data

US 2010/0124204 A1 May 20, 2010

(30) Foreign Application Priority Data

Nov. 20, 2008 (KR) ........................ 10-2008-0115510

(51) Int. Cl.
*H04W 4/00* (2009.01)
(52) U.S. Cl.
USPC .......................................... 370/332; 455/436
(58) Field of Classification Search
None
See application file for complete search history.

(56) References Cited

U.S. PATENT DOCUMENTS

| | | | | |
|---|---|---|---|---|
| 4,485,486 A * | 11/1984 | Webb et al. | ................... | 455/450 |
| 5,230,082 A * | 7/1993 | Ghisler et al. | ................ | 455/438 |
| 5,345,598 A * | 9/1994 | Dent | ............................ | 455/522 |
| 5,898,682 A * | 4/1999 | Kanai | ........................... | 370/331 |
| 6,434,387 B1 * | 8/2002 | Lee | ................................ | 455/436 |
| 6,922,559 B2 * | 7/2005 | Mohammed | .................. | 455/421 |
| 7,308,279 B1 * | 12/2007 | Zweig | ............................ | 455/522 |
| 7,864,678 B1 * | 1/2011 | Sampath et al. | ............... | 370/232 |
| 7,907,564 B2 * | 3/2011 | Laux et al. | ...................... | 370/329 |
| 2003/0045303 A1 * | 3/2003 | Oda et al. | ....................... | 455/456 |
| 2003/0153312 A1 * | 8/2003 | Lee et al. | ........................ | 455/436 |
| 2004/0137902 A1 * | 7/2004 | Chaskar et al. | ............... | 455/436 |
| 2005/0070322 A1 * | 3/2005 | Tayloe et al. | .................. | 455/522 |
| 2005/0075090 A1 * | 4/2005 | Bickham et al. | .............. | 455/344 |
| 2005/0259663 A1 * | 11/2005 | Ode et al. | ................... | 370/395.4 |
| 2006/0094369 A1 * | 5/2006 | Nguyen | ..................... | 455/67.13 |
| 2006/0114856 A1 * | 6/2006 | Hirata et al. | ................... | 370/331 |
| 2007/0173279 A1 * | 7/2007 | Kuroda et al. | ................ | 455/522 |
| 2007/0249351 A1 * | 10/2007 | An et al. | ........................ | 455/436 |
| 2008/0227457 A1 * | 9/2008 | Wu | ................................ | 455/437 |
| 2008/0233993 A1 * | 9/2008 | Koo | .............................. | 455/522 |
| 2008/0268833 A1 * | 10/2008 | Huang et al. | .................. | 455/425 |
| 2008/0293404 A1 * | 11/2008 | Scherzer et al. | ............ | 455/426.1 |
| 2008/0310368 A1 * | 12/2008 | Fischer | ......................... | 370/331 |
| 2009/0069004 A1 * | 3/2009 | Ergen et al. | ............... | 455/422.1 |
| 2009/0129268 A1 * | 5/2009 | Lin et al. | ........................ | 370/231 |
| 2009/0149140 A1 * | 6/2009 | Borran et al. | .............. | 455/114.2 |
| 2009/0196259 A1 * | 8/2009 | Pani et al. | ....................... | 370/332 |
| 2010/0002654 A1 * | 1/2010 | Lindoff et al. | ................ | 370/332 |
| 2011/0206006 A1 * | 8/2011 | Chindapol et al. | ............ | 370/331 |
| 2011/0255515 A1 * | 10/2011 | Maeda et al. | ................. | 370/331 |
| 2012/0008596 A1 * | 1/2012 | Jung et al. | ..................... | 370/331 |
| 2012/0115460 A1 * | 5/2012 | Lin et al. | ....................... | 455/423 |

* cited by examiner

*Primary Examiner* — Bunjob Jaroenchonwanit
(74) *Attorney, Agent, or Firm* — The Farrell Law Firm, P.C.

(57) ABSTRACT

A method and apparatus for improving unbalance of service at a cell edge in a Wireless Local Area Network (WLAN). A method of an Access Point (AP) for improving unbalance at service of a cell edge in a WLAN includes monitoring for a continuous decrease of a signal strength of a station over a predefined duration, determining if the station is to handover, when the continuous decrease of the signal strength occurs, and decreasing a transmit power of the AP, when it is determined that the corresponding station is to handover.

6 Claims, 7 Drawing Sheets

METHOD AND APPARATUS FOR IMPROVING UNBALANCE OF SERVICE OF CELL EDGE IN WIRELESS LOCAL AREA NETWORK

PRIORITY

This application claims priority under 35 U.S.C. §119(a) to a Korean Patent Application filed in the Korean Intellectual Property Office on Nov. 20, 2008 and assigned Serial No. 10-2008-0115510, the content of which is incorporated herein by reference.

BACKGROUND OF THE INVENTION

1. Field of the Invention

The present invention relates generally to a Wireless Local Area Network (WLAN), more particularly, to a method and apparatus for improving unbalance of service of stations located at a cell edge in a WLAN.

2. Description of the Related Art

Commonly, a WLAN includes a station (e.g., a personal computer, a notebook computer, a Personal Digital Assistant (PDA), etc.) equipped with a wireless Network Interface Card (NIC), and an Access Point (AP) that acts as a gateway between the station and an Internet Protocol (IP) network. The AP performs a similar function as a hub of a wired LAN. Twenty five to fifty stations may simultaneously access the AP in order to receive service from the AP in an area, commonly referred to as a "hot spot," of a radius of about 20 meters to 150 meters per AP.

Unlike a wired LAN that enables a flow of data only through a physical connection, a WLAN has additional security considerations because of the use of a wirelessly transmitted broadcasting medium. Additionally, a WLAN has mobility considerations for a station traveling between a serving AP and a target AR In order to ensure mobility, an Institute Electrical and Electronics Engineers (IEEE) 802.11 task group now proposes an Inter Access Point Protocol (IAPP). The IAPP receives information on a detected station from a lower layer and delivers state information on the moving station to a new AP from a previous AP of the moving station.

In the conventional art, a station accessing an AP becomes a subject of handover determination, scans peripheral APs considering, for example, signal strengths of the APs, selects a target AP using the scanning results, and handovers to the target AP. However, the station determines handover based on a signal strength of an AP and thus, despite the signal strength of the AP being equal to or greater than a threshold value from a perspective of the station, this determination does not actually take into account the signal strength from a perspective of the AP. That is, this determination merely assumes that a signal strength of the station is equal to or less than a threshold value at a side of the AP. Consequently, unbalance of service of an uplink and a downlink may occur. More specifically, because of a great difference between a transmit power of the AP and a transmit power of the station, there is a high probability of occurrence of the service unbalance in a cell edge.

Accordingly, there may be a problem in which stations located at a cell edge can normally receive voice and data packets from the other station, but the AP fails to successfully receive voice and data packets from the stations because of the relatively small signal strengths of the stations. Therefore, there is a need for a method and apparatus for improving this unbalance of service at a cell edge in a WLAN.

SUMMARY OF THE INVENTION

The present invention is designed to substantially solve at least the above problems and/or disadvantages and to provide at least the advantages described below. Accordingly, one aspect of the present invention is to provide a method and apparatus for improving unbalance of service at a cell edge in a Wireless Local Area Network (WLAN).

Another aspect of the present invention is to provide a power control and handover method and apparatus for improving unbalance of service in a WLAN.

In accordance with an aspect of the present invention, a method of improving unbalance of service at a cell edge in a WLAN is provided for an Access Point (AP). The method includes monitoring if there is a continuous decrease of a signal strength of a station during a predefined duration, when there is the continuous decrease of the signal strength of the station, determining if the station needs to handover, and, when it is determined that the station needs to handover, decreasing a transmit power.

In accordance with another aspect of the present invention, a method of improving unbalance of service at a cell edge in a WLAN is provided for an AP. The method includes monitoring a signal strength and transmission rate of a predetermined slot of a station, and decreasing a transmit power considering the signal strength and transmission rate of the corresponding station.

In accordance with another aspect of the present invention, a method of improving unbalance of service at a cell edge in a WLAN is provided for an AP. The method includes monitoring if there is a continuous decrease of a signal strength of a station during a predefined duration, when there is the continuous decrease of the signal strength of the station, determining if the station needs to handover, and, when it is determined that the station needs to handover, sending a handover command to the station.

In accordance with another aspect of the present invention, a method of improving unbalance of service at a cell edge in a WLAN is provided for a station. The method includes monitoring a signal strength of an (AP), and, when the signal strength of the AP is less than a threshold value, performing handover.

In accordance with another aspect of the present invention, a method of improving unbalance of service of a cell edge in a WLAN is provided for a station. The method includes receiving a handover command from an AP through control channel, and, upon receiving the handover command, performing handover.

In accordance with another aspect of the present invention, an AP for improving unbalance of service at a cell edge in a WLAN is provided. The AP includes a signal measurer, a handover controller, and a power controller. The signal measurer monitors if there is a continuous decrease of a signal strength of a station during a predefined duration. When there is the continuous decrease of the signal strength of the station, the handover controller determines if the station needs to handover. When it is determined that the station needs to handover, the power controller decreases a transmit power.

In accordance with another aspect of the present invention, an AP for improving unbalance of service at a cell edge in a WLAN is provided. The AP includes a controller and a power controller. The controller monitors a signal strength and transmission rate of a predetermined slot of a station. The power controller decreases a transmit power considering the signal strength and transmission rate of the station.

In accordance with another aspect of the present invention, an AP for improving unbalance of service at a cell edge in a WLAN is provided. The AP includes a signal measurer and a handover controller. The signal measurer monitors if there is a continuous decrease of a signal strength of a station during a predefined duration. When there is the continuous decrease of the signal strength of the station, the handover controller determines if the station needs to handover and, when it is determined that the station needs to handover, sends a handover command to the station.

In accordance with another aspect of the present invention, a station for improving unbalance of service at a cell edge in a WLAN is provided. The station includes a signal measurer and a handover manager. The signal measurer monitors a signal strength of an AP. When the signal strength of the AP is less than a threshold value, the handover manager performs handover.

In accordance with another aspect of the present invention, a station for improving unbalance of service at a cell edge in a WLAN is provided. The station includes a Radio Frequency (RF) processor and a handover manager. The RF processor receives a handover command from an AP through control channel. Upon receiving the handover command, the handover manager performs handover.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF EMBODIMENTS OF THE INVENTION

Certain embodiments of the present invention are described in detail below, with reference to the accompanying drawings. The same or similar components may be designated by the same or similar reference numerals although they are illustrated in different drawings. Detailed descriptions of constructions or processes known in the art may be omitted to avoid obscuring the subject matter of the present invention. Terms described below, which are defined considering functions in accordance with the embodiments of the present invention, may be different depending on user and operator intention or practice. Therefore, the terms should be defined on the basis of the disclosure throughout this specification.

In accordance with an embodiment of the present invention, a method and apparatus for improving unbalance of service of stations at a cell edge in a Wireless Local Area Network (WLAN) is provided.

Figure 1A:
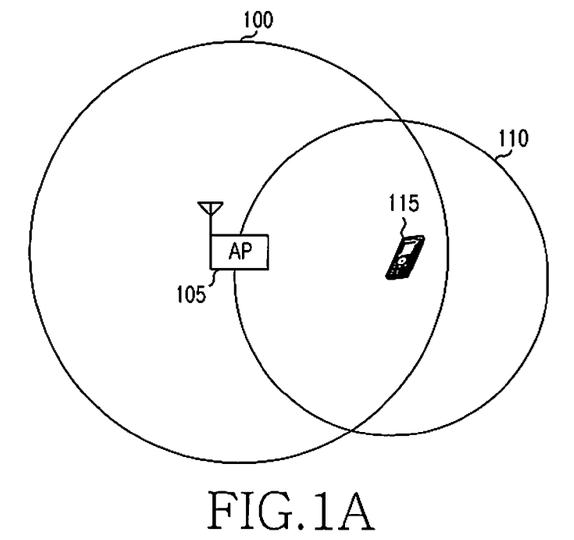
FIGS. 1A and 1B are diagrams illustrating power control and handover for improving unbalance of service of a station at a cell edge in a Wireless Local Area Network (WLAN) according to an embodiment of the present invention.
Figure 1B:
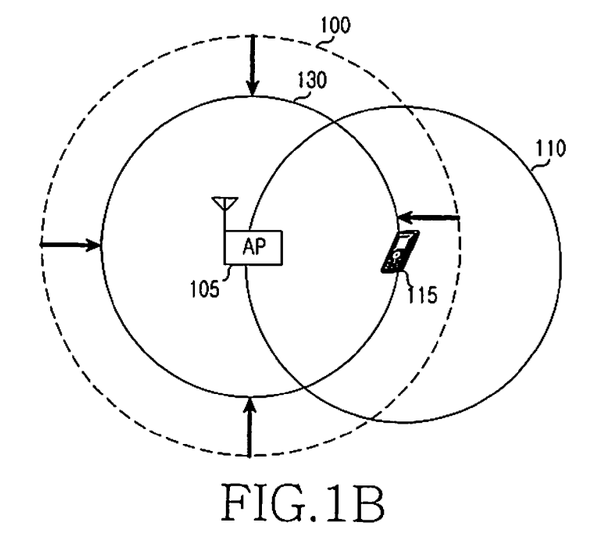

FIGS. 1A and 1B illustrate power control and handover for improving unbalance of service of a station at a cell edge in a WLAN according to an embodiment of the present invention.

Referring to FIG. 1A, an Access Point (AP) 105 for connecting to a wired Local Area Network (LAN) and/or a WLAN, connects a station 115 to an Internet Protocol (IP) network.

Additionally, the AP 105 controls access of the station 115 in a hot spot 100. Based on the Institute of Electrical and Electronics Engineers (IEEE) 802.11 standard, for example, the AP 105 uses a Distributed Coordination Function (DCF) binary random backoff algorithm in order for a plurality of stations to attempt channel access using Carrier Sense Multiple Access/Collision Avoidance (CSMA/CA) and reduce the probability of collisions. Alternatively, the AP 105 may use Point Coordination Function (PCF), in which a point coordinator controls authority, under which each station may occupy a medium using a polling mechanism.

The station 115, e.g., is a terminal equipped with a wireless Network Interface Card (NIC) such as a personal computer, a notebook computer, or a Personal Digital Assistant (PDA). The cell area 110 represents a general area in which the station 115 may transmit data depending on a transmit power. The cell area 110 may be diversely varied according to a variation of a wireless channel.

If a transmit output of the station 115 is lower than a transmit output of the AP 105, the station 115 may normally receive data from the AP 105, but the AP 105 may not normally receive packets from the station 115 at an edge of the hot spot 100. Even in this case, the station 105 has to perform a handover to a target AP and keep connection. However, because the station 105 determines HandOver (HO) based on a signal strength from the AP 115, the probability is high that the station 105 will not attempt the handover because of the higher signal strength than a threshold value. Therefore, as described above, the conventional art experiences unbalance of a service quality of a downlink and uplink between the station 115 at an edge of the hot spot 100 and the AP 105.

In accordance with an embodiment of the present invention, in order to provide a solution to a problem of the unbalance of the service quality of a downlink and uplink between the station 115 at the edge of the hotspot 100 and the AP 105, the AP 105 monitors a signal strength of the station 115 and analyzes packets received from the station 115. When it is determined the station is located at as edge of the hot spot 100, as illustrated in FIG. 1B, the AP 105 reduces a size of the hot spot 100 by decreasing a transmit signal strength of packets transmitted to the station 115, as indicated by reference numeral 130. This can induce a handover of the station 115 and thus, improve the unbalance of the service quality. That is, as the AP 105 reduces the initial hot spot 100, as indicated by reference numeral 130, by decreasing a transmit power, the station 115 may perform a handover to another target AP (not shown) in consideration of a signal strength from the AP 105.

However, when the station 115 performs the handover, the station 115 commonly attempts to access a target AP having a high signal strength among neighbor APs. However, even in this case, the target AP decreases a transmit signal strength in consideration of a signal strength of the station 115 attempting the handover.

Figure 2:
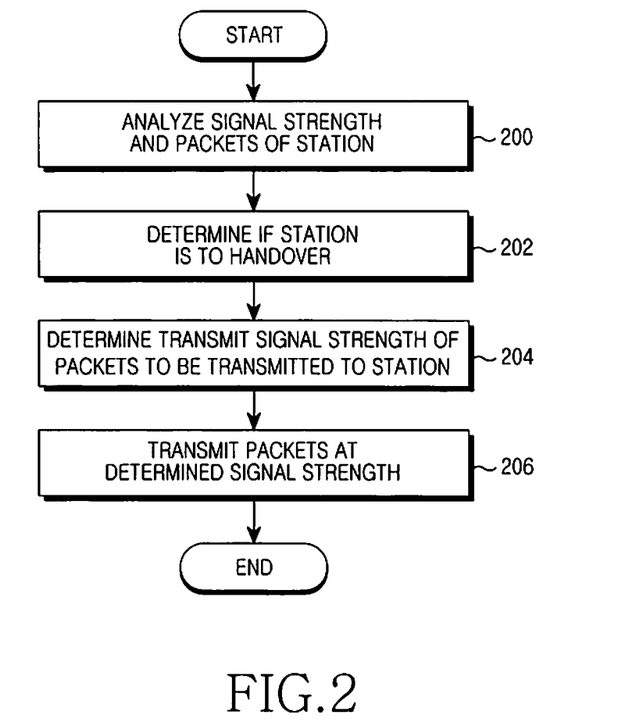
FIG. 2 is a flow diagram illustrating an operation of an Access Point (AP) for improving unbalance of service of stations at a cell edge in a WLAN according to an embodiment of the present invention.

FIG. 2 illustrates an operation of an AP for improving unbalance of service of stations at a cell edge in a WLAN according to an embodiment of the present invention.

Referring to FIG. 2, in step 200, the AP 105 monitors a signal strength of a station 115, and analyzes, for example, an error rate of packets received from the station 115, a retransmission time count, a transmission rate of the station, etc.

In step 202, the AP 105 determines if the station 115 is to handover using the analysis of step 200. When there is a continuous decrease of the signal strength of the station 115 identified within a sampling period, if the retransmission time count of the received packets is at least equal to a predefined threshold value and the transmission rate is at most equal to a predefined threshold value, the AP 105 determines that the station 115 is to handover. The determination of the handover may also be performed based on of the packet transmission rate or the packet retransmission time count.

When the station 115 is to handover, in step 204, the AP 105 determines a transmit signal strength of packets to be transmitted to the station 115. That is, if the retransmission time count of the received packets is equal to or is greater than a predefined threshold value and the transmission rate is equal to or is less than a predefined threshold value, the AP 105 lowers a transmit power of packets transmitted to the station 115. The transmit power may be lowered to a predefined magnitude or by a predetermined interval.

In step 206, the AP 105 transmits packets to the station 115 at the determined transmit power, i.e., the lower transmit power.

Although not illustrated in FIG. 2, even after lowering the transmit power and transmitting the packets, if the station 115 does not perform a handover and packet transmission continues, the AP 105 may repeat steps 200 to 204 to again lower the transmit power and transmits packets to the station 115.

Referring back to FIG. 1B, when there is a continuous decrease of the signal strength of the station 115, the AP 105 compares a packet retransmission time count and/or transmission rate with predetermined threshold value(s) and determines whether or not to handover the station 115.

Alternatively, in accordance with another embodiment of the present invention, the AP 105 may decrease a transmit power of packets transmitted to the station 115 to a specific value, which is based on transmission rate and signal strength information of a predetermined time slot of packets received from the station 115.

Table 1 below shows an example of a decrease of a transmit power resulting from a transmission rate of packets received by the AP 105 from the station 115 and a signal strength of the received packets.

TABLE 1

| Transmission rate of received packets | Signal strength of received packets | | | |
| --- | --- | --- | --- | --- |
| | −89 dBm | −88 dBm | −87 dBm | −86 dBm |
| 6 Mbps | −3.0 dBm | −2.0 dBm | −1.0 dBm | −0.5 dBm |
| 5.5 Mbps | −3.0 dBm | −2.0 dBm | −1.0 dBm | −0.5 dBm |
| 2 Mbps | −3.0 dBm | −2.0 dBm | −0.5 dBm | 0.0 dBm |
| 1 Mbps | −3.0 dBm | −2.0 dBm | 0.0 dBm | 0.0 dBm |

For example, if the signal strength of the receive packets is −89 dBm, the AP decreases the transmit power as much as −3 dBm, irrespective of the transmission rate of the received packets. Similarly, when the signal strength of the receive packets is −88 dBm, the AP decreases the transmit power as much as −2 dBm, irrespective of the transmission rate of the received packets. If the signal strength is −87 dBm and the transmission rate is 6 Mbps/5.5 Mbps, the AP decreases the transmit power as much as −1 dBm. If the signal strength is −87 dBm and the transmission rate is 2 Mbps, the AP decreases the transmit power as much as −0.5 dBm. If the signal strength is −87 dBm and the transmission rate is 1 Mbps, the AP does not decrease the transmit power. If the signal strength is −86 dBm and the transmission rate is 6 Mbps/5.5 Mbps, the AP decreases the transmit power as much as −0.5 dBm. If the signal strength is −86 dBm and the transmission rate is 2 Mbps/1 Mbps, the AP does not decrease the transmit power.

Table 1 is merely an example, and various factors in a wireless channel environment can lead to different values for decreasing a transmit power resulting from a transmission rate of received packets and a signal strength of the received packets.

Figure 3:
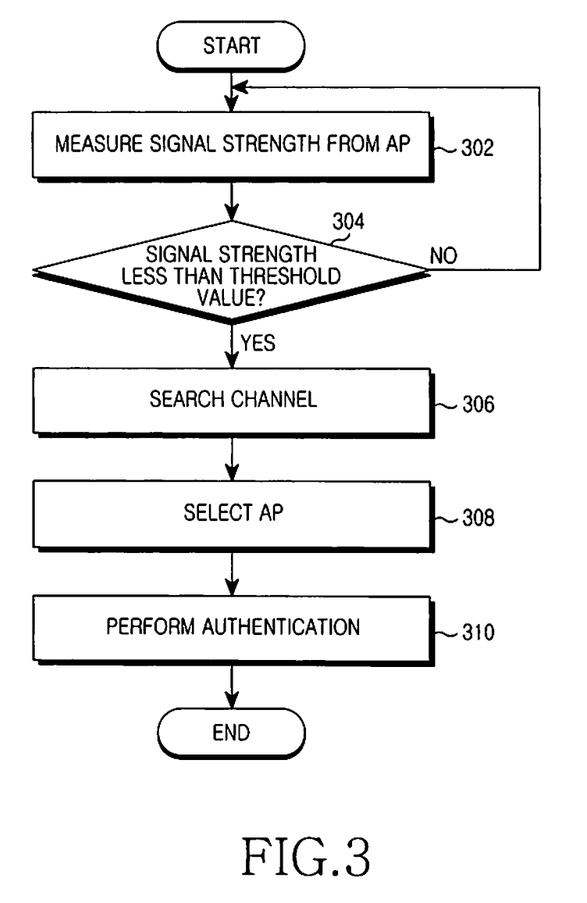
FIG. 3 is a flow diagram illustrating an operation of a station for improving unbalance of service at a cell edge in a WLAN according to an embodiment of the present invention.

FIG. 3 illustrates an operation of a station for improving unbalance of service at a cell edge in a WLAN according to an embodiment of the present invention.

Referring to FIG. 3, in step 302, the station 115 measures a signal strength of an AP 105 and, in step 304, determines if the measured signal strength of the AP 105 is less than a threshold value. If the signal strength of the AP 105 is greater than or is equal to the threshold value, in step 302, the station 115 continues measuring a signal strength of the AP 105.

If the signal strength of the AP 105 is less than a threshold value, in step 306, the station 115 searches peripheral APs through a channel search procedure. As a channel search procedure, in a passive fashion, the station 115 may periodically listen to beacon messages from the peripheral APs, or in an active fashion, may transmit probe messages to the peripheral APs and receive responses from the peripheral APs.

In step 308, the station 115 selects a target AP from among the searched APs, and in step 310, performs authentication with the target AP and completes the handover.

As described above, if a signal strength of packets transmitted by a station falls below a predetermined level, an AP lowers a transmit signal of packets transmitted to the station and induces a handover of the station, thereby improving unbalance of a service quality that may occur at a cell edge.

In accordance with another embodiment of the present invention, if a signal strength of packets transmitted by a station falls below a predetermined level, when it is determined that a station is to handover, an AP may also directly send a handover command to the station, without lowering a transmit signal of packets transmitted to the station.

Figure 4:
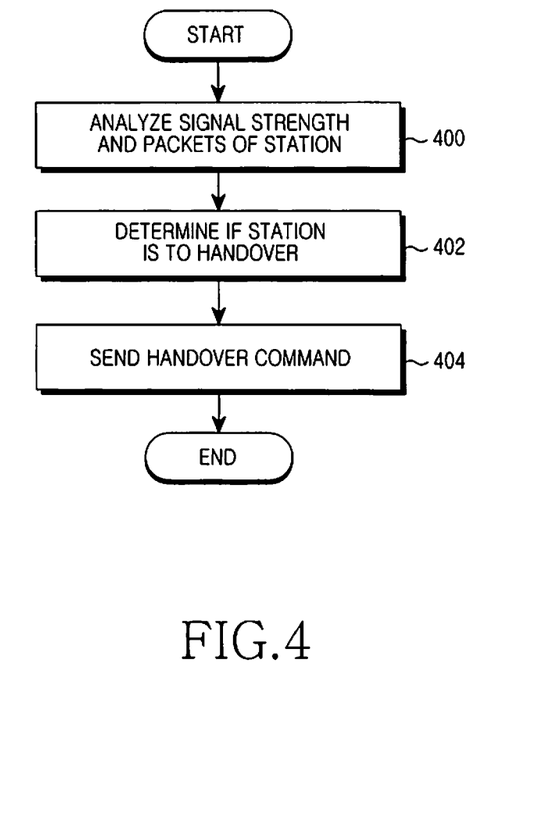
FIG. 4 is a flow diagram illustrating an operation of an AP for improving unbalance of service of stations at a cell edge in a WLAN according to an embodiment of the present invention.

FIG. 4 illustrates an operation of an AP for improving unbalance of service of stations at a cell edge in a WLAN according to an embodiment of the present invention.

Referring to FIG. 4, in step 400, the AP 105 monitors a signal strength of a station 115, and analyzes, for example, an error rate of packets received from the station 115, a retransmission time count, a transmission rate, etc.

In step 402, the AP 105 determines if the station 115 is to handover, based on the analysis from step 400. That is, if a signal strength of packets transmitted by the station 115 falls below a predetermined level, the AP 105 compares the packet retransmission time count and/or packet transmission rate with threshold value(s) and determines if the station 115 is to handover.

When the station 115 is to handover, in step 404, the AP 105 sends a handover command to the station 115 through a control channel.

Figure 5:
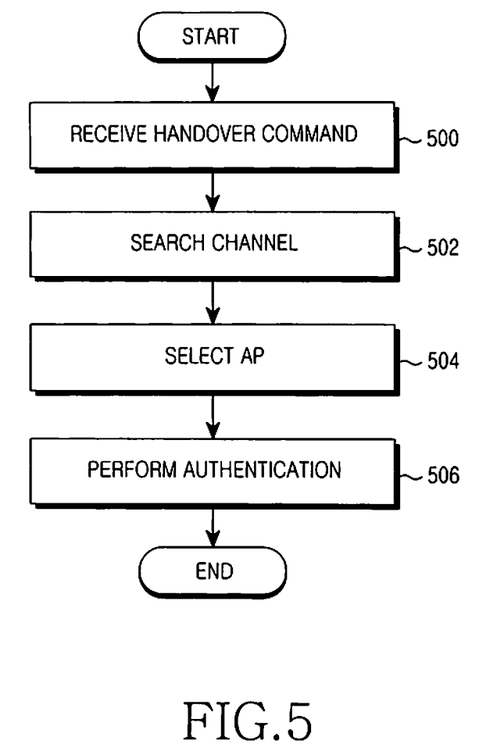
FIG. 5 is a flow diagram illustrating an operation of a station for improving unbalance of service at a cell edge in a WLAN according to an embodiment of the present invention.

FIG. 5 illustrates an operation of a station for improving unbalance of service at a cell edge in a WLAN according to an embodiment of the present invention.

Referring to FIG. 5, in step 500, the station 115 receives a handover command from an AP 105. In step 502, the station 115 searches peripheral APs through a channel search procedure, and in step 504, the station 115 selects a target AP from among the searched APs. In step 506, the station 115 performs authentication with a target AP and completes handover.

Figure 6:
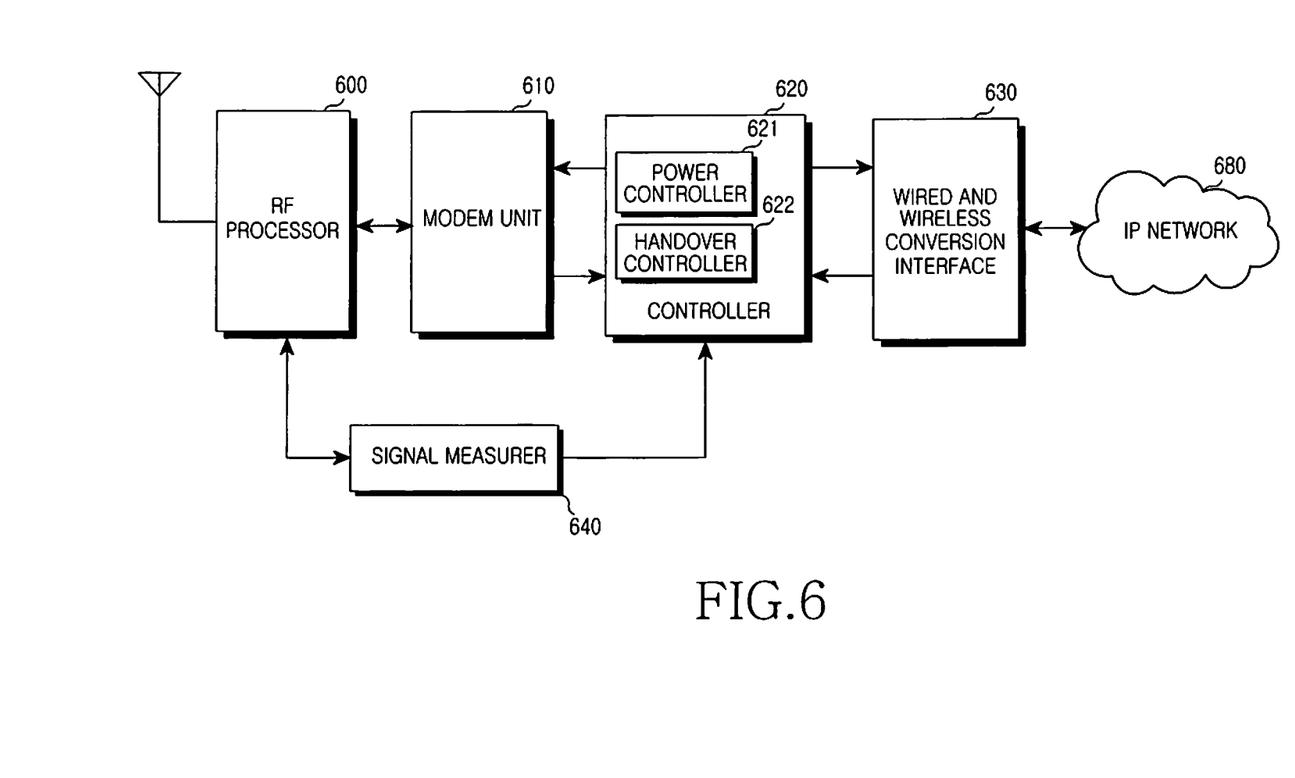
FIG. 6 is a block diagram illustrating an AP apparatus for improving unbalance of service of stations at a cell edge in a WLAN according to an embodiment of the present invention.

FIG. 6 illustrates an AP apparatus for improving unbalance of service of stations at a cell edge in a WLAN according to an embodiment of the present invention.

Referring to FIG. 6, the AP includes a Radio Frequency (RF) processor 600, a modem unit 610, a controller 620, a wired and wireless conversion interface 630, and a signal measurer 640.

The RF processor 600 converts RF signals from stations into baseband signals and outputs the baseband signals to the modem unit 610, or converts a baseband signal from the modem unit 610 into an RF signal. Particularly, in accordance with an embodiment of the present invention, the RF processor 600 sends a handover command message to a corresponding station.

The modem unit 610 demodulates a baseband signal from the RF processor 600 and provides the demodulated signal to the controller 620, or modulates a control signal (e.g., a handover command) and data signal from the controller 620 and transmits the signals to the RF processor 600.

A combination of the RF processor 600 and the modem unit 610 is commonly called a physical layer.

The controller 620, e.g., a wireless Media Access Control (MAC) engine, controls a use authority over transmission media shared by a plurality of stations. When transmitting data, the controller 620 controls wireless channel contention and detects the normality or abnormality of a transmission path. Also, the controller 620 can even apply a polling-based central control scheme as an option.

In accordance with an embodiment of the present invention, the controller 620 monitors a signal strength of a station and, upon need, controls a transmit power. The power control is performed in the modem unit 610 or the RF processor 600 under the control of the controller 620. That is, the modem unit 610 or the RF processor 600 transmits a signal at a power value controlled by the controller 620. In order to perform these functions, the controller 620 includes a power controller 621 and a handover controller 622.

The controller 620 receives a signal strength measurement value of a station from the signal measurer 640, and monitors if there is a continuous decrease of a signal strength of the station. Further, the controller 620 analyzes, for example, an error rate of packets received from the station, a retransmission time count, a transmission rate, etc.

When there is a continuous decrease of a signal strength of the station identified within a sampling period, the handover controller 622 compares a retransmission or non-retransmission of received packets and a transmission rate with threshold values and determines if the station is to handover. That is, if a retransmission time count of received packets is equal to or greater than a predefined threshold value and a transmission rate is equal to or less than a predefined threshold value, the handover controller 622 determines that the station is to handover. Alternatively, the determination can be also performed using one of the transmission rate or the retransmission time count of the packets.

When the station is to handover, the power controller 621 determines a transmit signal strength of packets to be transmitted to the corresponding station. If the retransmission time count of the received packet is equal to or greater than a predefined threshold value and the transmission rate is equal to or less than a predefined threshold value, the power controller 621 lowers a transmit power of packets transmitted to the corresponding station. As described above, the transmit power may be lowered to a predefined magnitude, or lowered by a predetermined amount.

The controller 620 transmits packets to the corresponding station at the determined transmit power through the modem unit 610 and the RF processor 600.

After lowering the transmit power and transmitting the packets, if the station still does not perform a handover and packet transmission continues, the controller 620 may again lowers the transmit power and transmit packets to the station.

The signal measurer 640 measures a signal strength of the station and provides the result to the controller 620.

The wired and wireless conversion interface 630 transmits voice and data packets of the station to an IP network 680 or transmits packets from the IP network 680 to the controller 620.

Figure 7:
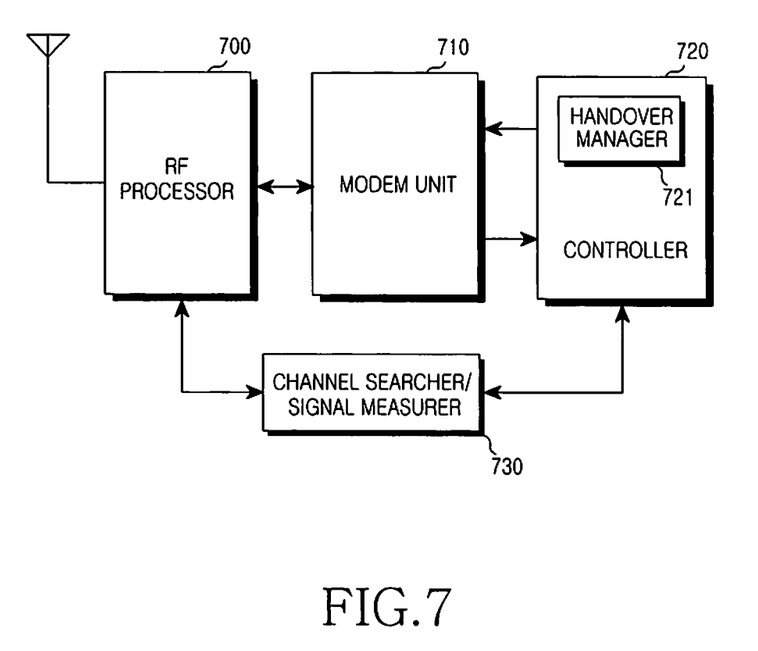
FIG. 7 is a block diagram illustrating a station apparatus for improving unbalance of service at a cell edge in a WLAN according to an embodiment of the present invention.

FIG. 7 illustrates a station apparatus for improving unbalance of service at a cell edge in a WLAN according to an embodiment of the present invention.

Referring to FIG. 7, the station includes an RF processor 700, a modem unit 710, a controller 720, and a channel searcher/signal measurer 730.

The RF processor 700 converts an RF signal from an AP into a baseband signal and outputs the baseband signal to the modem unit 710, or converts a baseband signal from the modem unit 710 into an RF signal. In accordance with an embodiment of the present invention, the RF processor 700 receives a handover command message from an AP.

The modem unit 710 demodulates a baseband signal from the RF processor 700 and provides the demodulated signal to the controller 720, or modulates a control signal and data signal from the controller 720 and transmits the modulated signals to the RF processor 700. A combination of the RF processor 700 and the modem unit 710 is commonly referred to as "a physical layer".

The signal measurer 730 measures a signal strength of the AP and provides the measured signal strength to the controller 720. The channel searcher 730 searches peripheral APs through a channel search procedure and provides the result to the controller 720. As described above, in a passive fashion, the station 115 may periodically listen to beacon messages from the peripheral APs, or in an active fashion, may transmit probe messages to the peripheral APs and receive responses from the peripheral APs.

The controller 720 determines if the measured signal strength of the AP is less than a threshold value and performs handover. Accordingly, as illustrated in FIG. 7, the controller 720 includes a handover manager 721.

The handover manager 721 selects a target AP from among the searched APs, performs authentication with the target AP, and then completes the handover.

As described above, an AP in accordance with an embodiment of the present invention can improve unbalance of service of stations at a cell edge by performing power control considering a signal strength of a station.

Also, aside from a station at a cell edge, the AP can induce handover even without changing a handover scheme of a station.

Although the present invention has been shown and described with reference to certain embodiments thereof, it will be understood by those skilled in the art that various changes in form and details may be made therein without departing from the spirit and scope of the present invention as defined by the appended claims and their equivalents. Therefore, the scope of the present invention should not be limited to the above-described embodiments but should be determined by the appended claims and any equivalents thereof.

What is claimed is:

1. A method of an Access Point (AP) for improving unbalance of service at a cell edge in a Wireless Local Area Network (WLAN), the method comprising:
   monitoring, at the AP, a signal strength of a station for a continuous decrease of the signal strength over a predefined duration;
   determining, at the AP, whether a retransmission time count of received packets is greater than or equal to a first predefined threshold value and whether a transmission rate is less than or equal to a second predefined threshold value, when there is the continuous decrease of the signal strength;
   determining, at the AP, that the station is to handover, when the retransmission time count is greater than or equal to the first predefined threshold value and the transmission rate is less than or equal to the second predefined threshold value; and
   decreasing, at the AP, a transmit power of the AP to improve unbalanced uplink and downlink, when it is determined that the station is to handover;
   wherein the uplink comprises a link from the station to the AP and the downlink comprises a link from the AP to the station; and
   wherein the transmit power of the AP is greater than the transmit power of the station.

2. The method of claim 1, wherein decreasing the transmit power of the AP comprises one of:
   decreasing the transmit power of the AP to a predetermined magnitude; and
   decreasing the transmit power of the AP by a predetermined increment.

3. An Access Point (AP) for improving unbalance of service at a cell edge in a Wireless Local Area Network (WLAN), the AP comprising:
   a controller for monitoring for a continuous decrease of a signal strength of a station over a predefined duration, and determining whether a retransmission time count of received packets is greater than or equal to a first predefined threshold value and whether a transmission rate is less than or equal to a second predefined threshold value, when there is the continuous decrease of the signal strength;
   a handover controller for determining that the station is to handover, when the retransmission time count is greater than or equal to the first predefined threshold value and the transmission rate is less than or equal to the second predefined threshold value; and
   a power controller for decreasing a transmit power of the AP, when it is determined that the station is to handover;
   wherein the uplink comprises a link from the station to the AP and the downlink comprises a link from the AP to the station;
   wherein a transmit power of the AP is greater than a transmit power of the station.

4. The AP of claim 3, wherein the transmit power is decreased to a predetermined magnitude or by a predetermined amount.

5. A method of an Access Point (AP) for improving unbalance of service at a cell edge in a Wireless Local Area Network (WLAN), the method comprising:
   monitoring a signal strength of a station for a continuous decrease of the signal strength of the station over a predefined duration;
   determining whether a retransmission time count of received packets is greater than or equal to a first predefined threshold value and whether a transmission rate is less than or equal to a second predefined threshold value, when there is the continuous decrease of the signal strength of the station;
   determining that the station is to handover, when the retransmission time count is greater than or equal to the first predefined threshold value and the transmission rate is less than or equal to the second predefined threshold value; and
   sending a handover command to the station, when it is determined that the station is to handover to improve unbalanced uplink and downlink;
   wherein the uplink comprises a link from the station to the AP and the downlink comprises a link from the AP to the station; and
   wherein a transmit power of the AP is greater than a transmit power of the station.

6. An Access Point (AP) for improving unbalance of service at a cell edge in a Wireless Local Area Network (WLAN), the AP comprising:
   a controller for monitoring a signal strength of a station for a continuous decrease of the signal strength of a station over a predefined duration, and determining whether a retransmission time count of received packets is greater than or equal to a first predefined threshold value and whether a transmission rate is less than or equal to a second predefined threshold value, when there is the continuous decrease of the signal strength; and
   a handover controller for determining that the station is to handover, when the retransmission time count is greater than or equal to the first predefined threshold value and the transmission rate is less than or equal to the second predefined threshold value, and for sending a handover command to the station, when it is determined that the station is to handover, to improve unbalanced uplink and downlink,
   wherein the uplink comprises a link from the station to the Ap and the downlink comprises a link from the AP to the station; and
   wherein a transmit power of the AP is greater than a transmit power of the station.

* * * * *